United States Patent [19]

Yeomans

[11] Patent Number: 4,916,810

[45] Date of Patent: Apr. 17, 1990

[54] METHOD AND APPARATUS FOR TERMINATING WIRES TO TERMINALS

[75] Inventor: Michael A. Yeomans, Camp Hill, Pa.

[73] Assignee: AMP Incorporated, Harrisburg, Pa.

[21] Appl. No.: 351,108

[22] Filed: May 12, 1989

[51] Int. Cl.$^4$ .................... H01R 43/04; B23P 19/00

[52] U.S. Cl. .................................... 29/863; 29/753

[58] Field of Search ................ 29/753, 863, 861, 862, 29/748

[56] References Cited

U.S. PATENT DOCUMENTS 4,400,873 8/1983 Kindig et al. ........................ 29/753
4,856,186 8/1989 Yeomans .......................... 29/748 X

FOREIGN PATENT DOCUMENTS 184204 6/1986 European Pat. Off. ............ 29/753

*Primary Examiner*—Carl J. Arbes
*Attorney, Agent, or Firm*—James M. Trygg

[57] ABSTRACT

The present invention is a method and apparatus for terminating wires in terminals while monitoring the quality of the termination. Quantitative data is collected during the terminating operation, analyzed to determine whether or not the quality of the termination is within acceptable limits, and appropriate machine mechanisms are adjusted, when required, to assure continued high quality output. This is done in a completely automated environment.

9 Claims, 6 Drawing Sheets

METHOD AND APPARATUS FOR TERMINATING WIRES TO TERMINALS

This invention relates to the termination of wires to respective terminals and to the controlling of the quality of such terminations.

BACKGROUND OF THE INVENTION

Terminals are typically crimped onto wires by means of a conventional crimping press having an anvil for supporting the electrical terminal and a die that is movable toward and away from the anvil for effecting the crimp. In operation, a terminal is placed on the anvil, an end of a wire is inserted into the ferrule or barrel of the terminal, and the die is caused to move toward the anvil to the limit of the stroke of the press, thereby crimping the terminal onto the wire. The die is then retracted to its starting point.

In order to obtain a satisfactory crimped connection, the "crimp height" of the terminal must be closely controlled. The crimp height of a terminal is a measure of height or maximum vertical dimension of a given portion of the terminal after crimping. Ordinarily, if a terminal is not crimped to the correct crimp height for the particular terminal and wire combination, an unsatisfactory crimped connection will result. A crimp height variation is not in and of itself the cause of a defective crimp connection, but rather, is indicative of another factor which causes the poor connection. Such factors include using the wrong terminal or wire size, missing strands of wire, wrong wire type, and incorrect stripping of insulation. Since such defective crimped connections frequently have the appearance of high quality crimped connections, it is difficult to identify these defects so that timely corrective action may be taken.

A simple non-destructive means of detecting such defective crimped connections by accurately measuring crimp height during the crimping process is disclosed in copending application Ser. No. 266,977, filed Nov. 4, 1988 which is incorporated by reference as though set forth verbatim herein.

What is needed is an apparatus and method of use thereof of utilizing these teachings in an automated environment to fine adjust elements of the crimping machine, during operation, to maintain the quality of the crimp within allowable limits. The present invention accomplishes this by collecting operational data during production, analyzing the data, and adjusting appropriate machine elements to correct any existing or anticipated out of tolerance condition.

SUMMARY OF THE INVENTION

The present invention is a method and apparatus for terminating a plurality of wires in a plurality of respective terminals in an automated machine environment while monitoring the quality of crimp and automatically adjusting machine elements to maintain a high quality crimp. Coded information indicative of a desired crimp height is manually input to the machine. The machine, in response to this input, automatically adjusts the height of the anvil above the base. A test for completion of the job is initiated. If no further terminations are needed, an end-of-job signal is generated and the machine is shut down. Otherwise, a wire is terminated in a respective terminal. During the terminating step, force and ram position data elements are collected and recorded for different incremental values. The crimp height of the present termination is determined and compared with the desired crimp height. If an out of tolerance condition exists, a reject signal is generated, the machine again is automatically adjusted, and if the job is not yet complete, another wire is terminated in a respective terminal as above. If an out of tolerance condition does not exist, an accept signal is generated and a comparison is made between the desired crimp height and the crimp height of several of the most recent terminations to determine whether or not there is a trend toward an out-of-tolerance condition. If there is such a trend, the machine is again automatically adjusted and production resumed.

BRIEF DESCRIPTION OF THE PREFERRED EMBODIMENT

Figure 1:
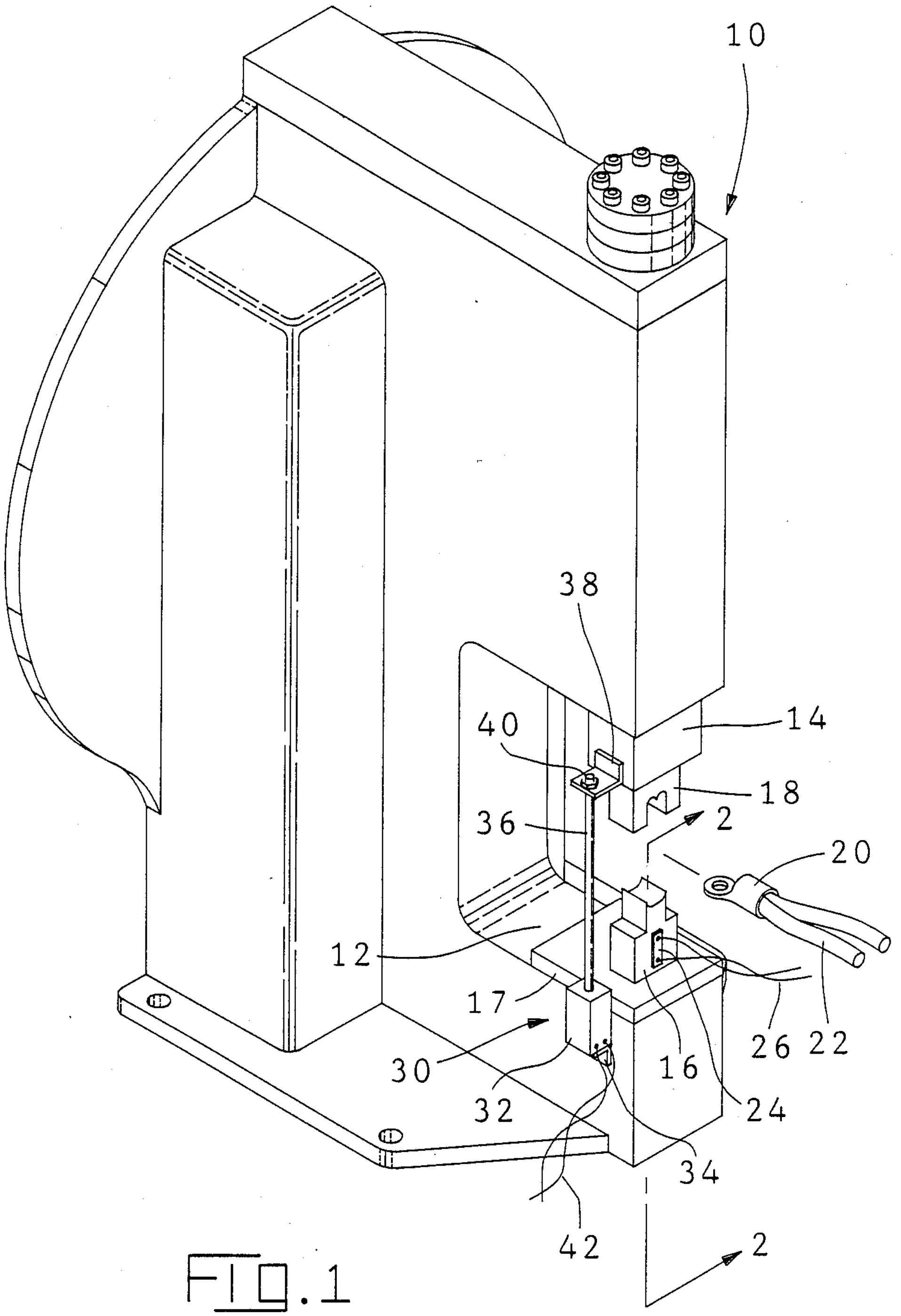
FIG. 1 is an isometric view of a crimping apparatus incorporating the teachings of the present invention.

There is shown in FIG. 1 a crimping press 10 having a base 12 and a ram 14 arranged for reciprocating opposed motion relative to the base 12. The crimping press 10, in the present example, is the type having a flywheel and clutch arrangement for imparting the reciprocating motion to the ram 14, however, other types of presses having a suitable ram stroke may be used in the practice of the present invention.

The base 12 and ram 14 each carry a mating half of a crimping die set in the usual manner. The die set includes an anvil 16 which is removably attached to a base plate 17 and a punch 18 which is removably attached to the ram 14, as shown in FIG. 1. The base plate 17 is coupled to the base 12 in a manner that will be described below. A typical terminal 20 is shown, in FIG. 1, crimped onto a pair of wire leads 22.

As shown in FIG. 1, a strain gage 24 is attached to the anvil 16 in the usual manner by epoxy or soldering. A pair of leads 26 carry a signal that is proportional to the stress placed on the anvil 16 which is transferred from the ram 14, through the terminal 20 and wires 22 being crimped, to the anvil 16. The signal appearing on the leads 26 is indicative of the force imposed upon the terminal 20 during crimping, as set forth in more detail in the aforementioned Ser. No. 266,977 application.

A linear distance sensor 30 is arranged to measure displacement of the ram 14 with respect to the base 12. The sensor 30 includes a stator 32, which is rigidly attached to the base 12 by a suitable bracket 34, and an armature which is movable within the stator in the vertical direction as viewed in FIG. 1. A push rod 36 projects upwardly from the stator 32 and has one end attached to the movable armature and the other end adjustably attached to the ram 14 by means of a suitable bracket 38 and adjusting nut 40. A pair of leads 42 carry a signal that is proportional to the vertical position of the armature within the stator. This signal is indicative of the vertical distance between the anvil 16 and the punch 18 as set forth in more detail in the Ser. No.

266,977 application. As explained there, by monitoring the signals on the leads 26 and 42, the actual crimp height of the crimped terminal 20 can be accurately determined. Additionally, other parameters may be determined as well, such as peak force exerted on the terminal 20 and the amount of work performed to complete the crimp.

Figure 2:
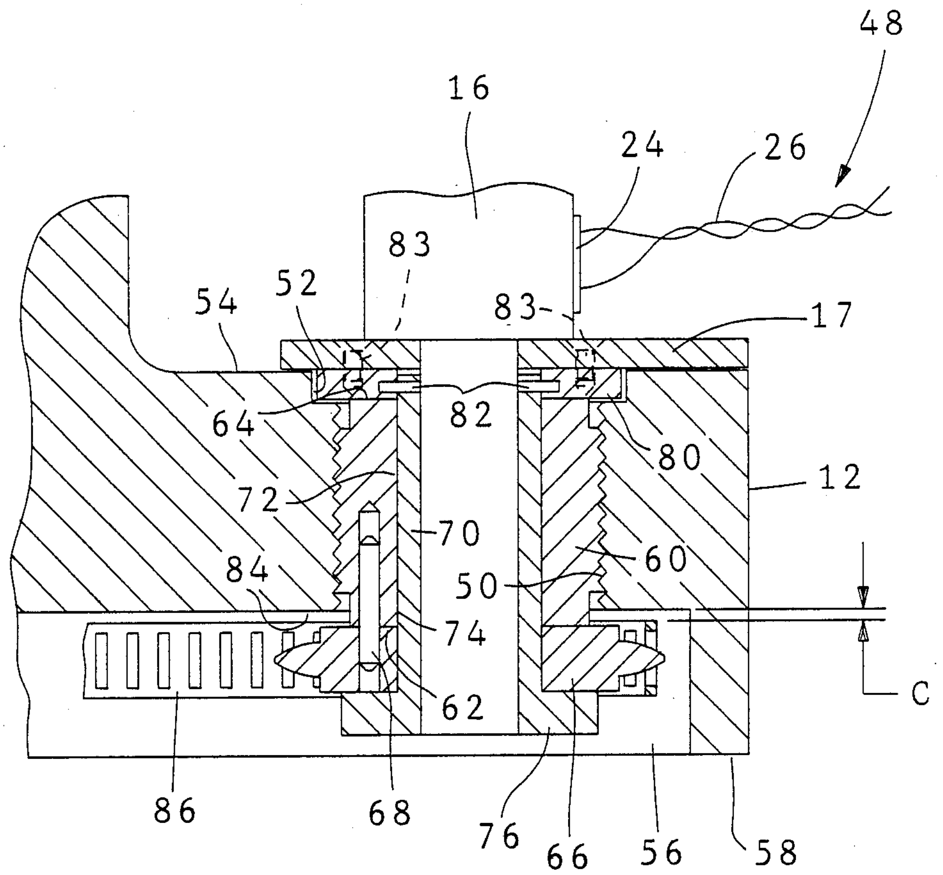
FIG. 2 is a cross-sectional view of a portion of the apparatus taken along the lines 2—2 of FIG. 1.

FIG. 2 shows how the base plate 17 is coupled to the base 12, by means of an adjustable platen or coupling means 48. The base 12 has a threaded bore 50 formed therethrough having an axis that is substantially parallel with the axis of movement of the ram 14. A counterbore 52 is formed in the top surface 54 concentric with the threaded bore 50 and an elongated recess 56 is formed in the bottom surface 58 of the base 12. A threaded sleeve 60 is in mating engagement with the threaded bore 50 and has parallel opposing ends 62 and 64. The pitch of the threads is relatively fine so that sufficiently accurate adjustments may be made. Additionally, the thread must be massive enough to support the loads imposed by the terminating operation. A $1\frac{3}{8}$ inch×12 N.F. thread was found to be quite satisfactory. A sprocket wheel 66 is pinned to the end 62 of the threaded sleeve 60 by means of two or more pins 68, the sprocket being concentric with the threaded bore 50. Note that the pins 68 do not hold the two parts together axially, but rather provide rotational coupling. A sleeve 70 having an outer diameter 72 is disposed within a bore 74 formed axially through the sprocket 66 and threaded sleeve 60 and concentric thereto. The outer diameter 72 is sized for a slip fit with the bore 74. A hub or flange 76 is attached to one end of the sleeve 70 and abuts the undersurface of the sprocket 66, as best seen in FIG. 2. An adapter collar 80 having a central bore which engages the outer diameter 72 of the sleeve 70 is pinned to the sleeve 70 by means of the pins 82 as shown in FIG. 2. Additionally, the base plate 17 is attached to the adapter collar 80 by means of the screw fasteners 83. The collar 80 is positioned on the sleeve 70 so that the threaded sleeve 60 and sprocket wheel 66 are held captive between the flange 76 and collar 80 with a slight amount of axial play. The pinned assembly of the threaded sleeve 60 and the sprocket 66 is free to rotate on the sleeve 70 within the limits set by the amount of clearance indicated as "C" in FIG. 2. That is, as the sprocket wheel 66 is caused to rotate in one direction, the threaded sleeve 60 will move upwardly in the threaded bore 50, as viewed in FIG. 2, until the side of the sprocket 66 engages the inner surface 84 of the recess 56. As the sprocket wheel 66 is caused to rotate in the opposite direction, the threaded sleeve 60 will move downwardly in the threaded bore 50 until the base plate 17 engages the top surface 54 of the base 12. A timing belt or chain 86 in driving engagement with the sprocket wheel 66 extends within the recess 56 to a stepper motor, not shown. The stepper motor, as will be described below, is arranged to drive the timing belt 86 a precise amount in a given direction to raise or lower the base plate 17 a desired amount.

Figure 3:
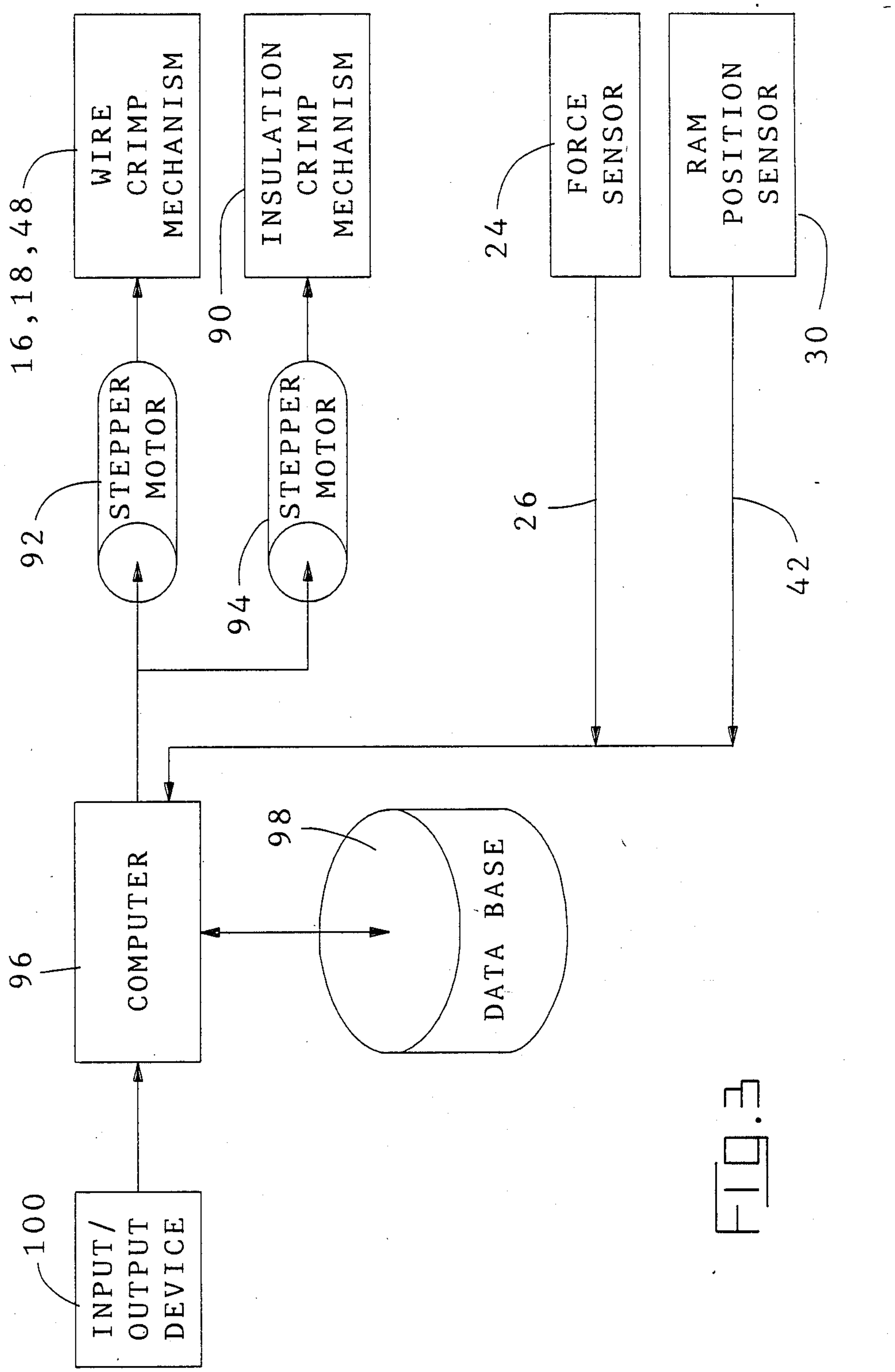
FIG. 3 is a block diagram showing typical functional elements employed in the practice of the present invention.

The major functions of the machine are shown in FIG. 3. Note that the wire crimping mechanism is identified as 16, 18, and 48 which represent the anvil, punch, and coupling means respectively, and the force and ram position sensors are identified as 24 and 30 which represent the strain gage and linear distance sensor respectively. An insulation crimping mechanism 90 is depicted in FIG. 3 as an example of other instrumentalities that may be controlled in a manner similar to that of the wire crimping mechanism. Other similar instrumentalities may also be controlled in a similar way. The actual adjusting means which physically moves or adjusts the coupling means 48, in the case of the wire crimp mechanism, or another adjustable device in the case of the insulation crimp mechanism, are driven by stepper motors 92 and 94 respectively. Any suitable actuator which can be driven through a computer input/output channel may be substituted for the stepper motors 92 and 94. A computer 96 having a storage device 98 associated therewith for storing a data base and an input/output device 100 for operator communication, is arranged to drive the stepper motors 92 and 94. This is done in response to operator input through the device 100 and input from either the force sensor 24 or the ram position sensor 30.

The operation of the machine 10 will now be described in detail with reference to the logic diagram of FIG. 4. It is assumed that a data base containing appropriate product information has already been created and stored on the storage device 98 in a manner that is well known in the art. The data base would include such product identifying parameters as terminal part number and crimp height, wire gage, number of wires, and applicator or tooling part number. To begin, the operator determines which product is to be crimped and inputs into the device 100 the product identifying code or number as well as wire type, wire size, and number of conductors, shown as step 110 in FIG. 4. The computer 96, by means of a stored program, recalls from the data base, parameters for setting various elements of the machine, including crimp height, based upon the parameters which were input by the operator, shown as step 112. The computer 96 automatically adjusts the wire crimp mechanism 48 and the insulation crimp mechanism 90 by driving the stepper motors 92 and 94 respectively until the desired nominal crimp height of each is obtained shown as step 114. At this point, step 116, the computer 96 interrogates an end-of-job switch which may have been previously set by the operator. If set, an end-of-job signal is generated and displayed to the operator on the input/output device 100. If another job is required, control is passed to the point indicated as A to repeat the steps 110 through 116.

If the job is not complete at step 116, the computer 96 enables the press drive motor, not shown, to drive the ram 14 through an operating cycle, thereby completing a termination, step 118. During this operation, the computer 96 monitors the force and ram position sensors and records on the storage device 98 a series of data element pairs each of which is indicative of an amount of force on the terminal 20 and a corresponding position of the ram 14 as indicated by the sensors 24 and 30. See step 120 of FIG. 4. Any number of data element pairs may be collected and stored in this manner for a given resolution, however, practical considerations have shown that a data sampling rate of about 4000 pairs per second provides sufficient resolution to obtain a desired crimp height within a range of about plus or minus 0.001 inches. After the termination is complete, the crimp height is determined, see step 122, based on the crimp force and ram position data in accordance with the teachings of the aforementioned Ser. No. 266,977 patent application. The computer 96 then compares the determined crimp height with the allowable range of crimp heights in step 124. If the crimp height is outside of the allowable range, a reject signal is generated and displayed on the input/output device 100 so that the operator can discard the defective termination. Alternatively, the reject signal could actuate a mechanism to rout the defective termination to a preselected location for later disposal. Control is then passed to the point indicated as B and steps 114 through 124 are repeated.

If the crimp height of step 124 is within the limits allowed, an accept signal is generated and the computer 96, in step 126, recalls the most recent data element pairs. As shown in step 126, the data element pairs are then analyzed by the computer 96 by any suitable method to determine whether or not there is an out-of-tolerance trend, that is, in a relatively few number of additional operating cycles of the machine 10, the determined crimp height will be outside of the allowable range. If such a trend does exist, control is passed to the point indicated as B and steps 114 through 126 are repeated, otherwise control is passed to the point indicated as C thereby bypassing step 114. Step 114 should be constructed so that the machine 10 will automatically adjust the appropriate mechanisms both initially, based on the manually input parameters and ongoing, based on the results of steps 124 and 126. This can easily be done by software within the computer 96 in a variety of ways that are well-known in the industry.

Figure 4A:
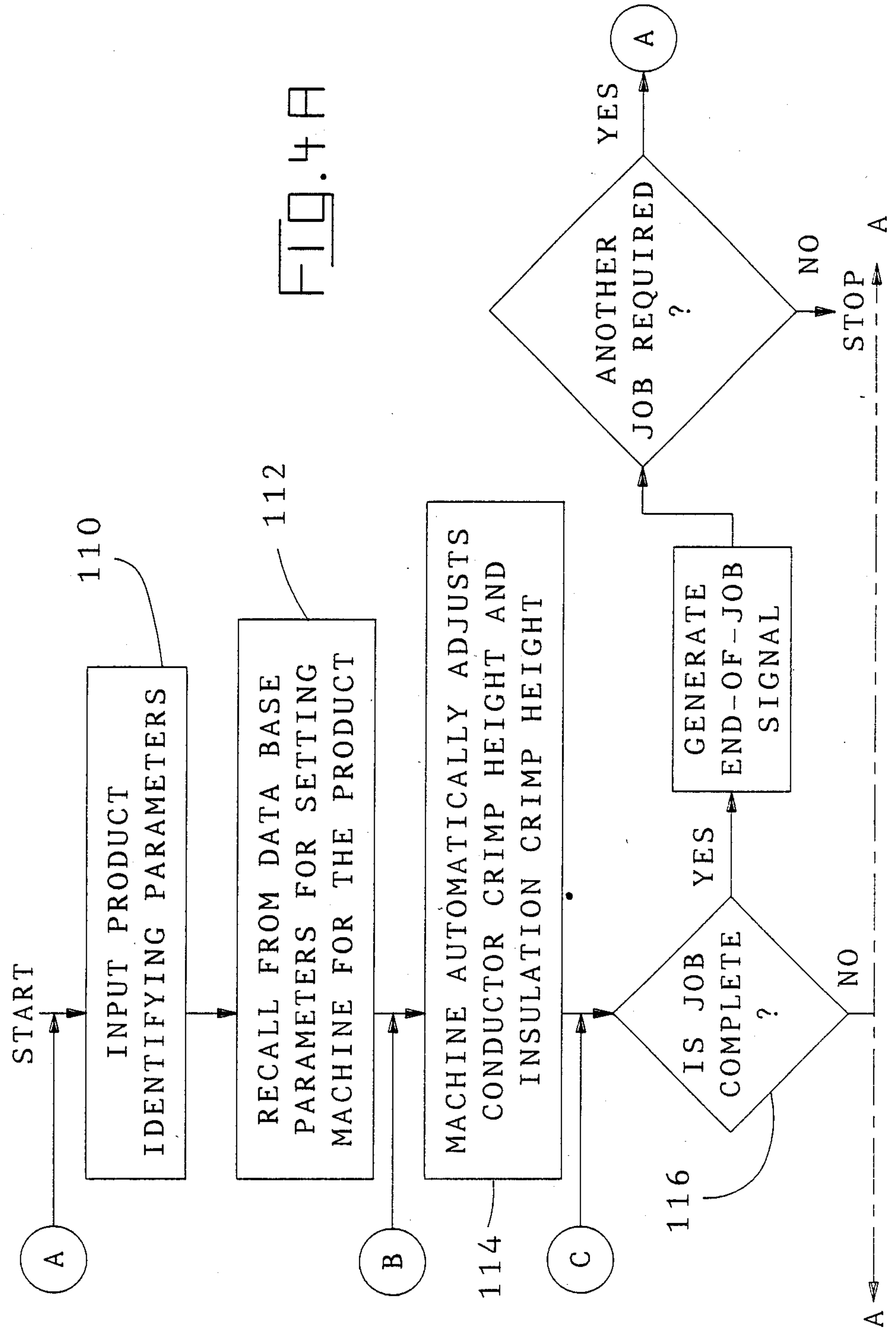
FIGS. 4A, 4B, and 4C are segments of a logic diagram showing details of the inventive method. These figures will be hereinafter collectively referred to as FIG. 4.
Figure 4B:
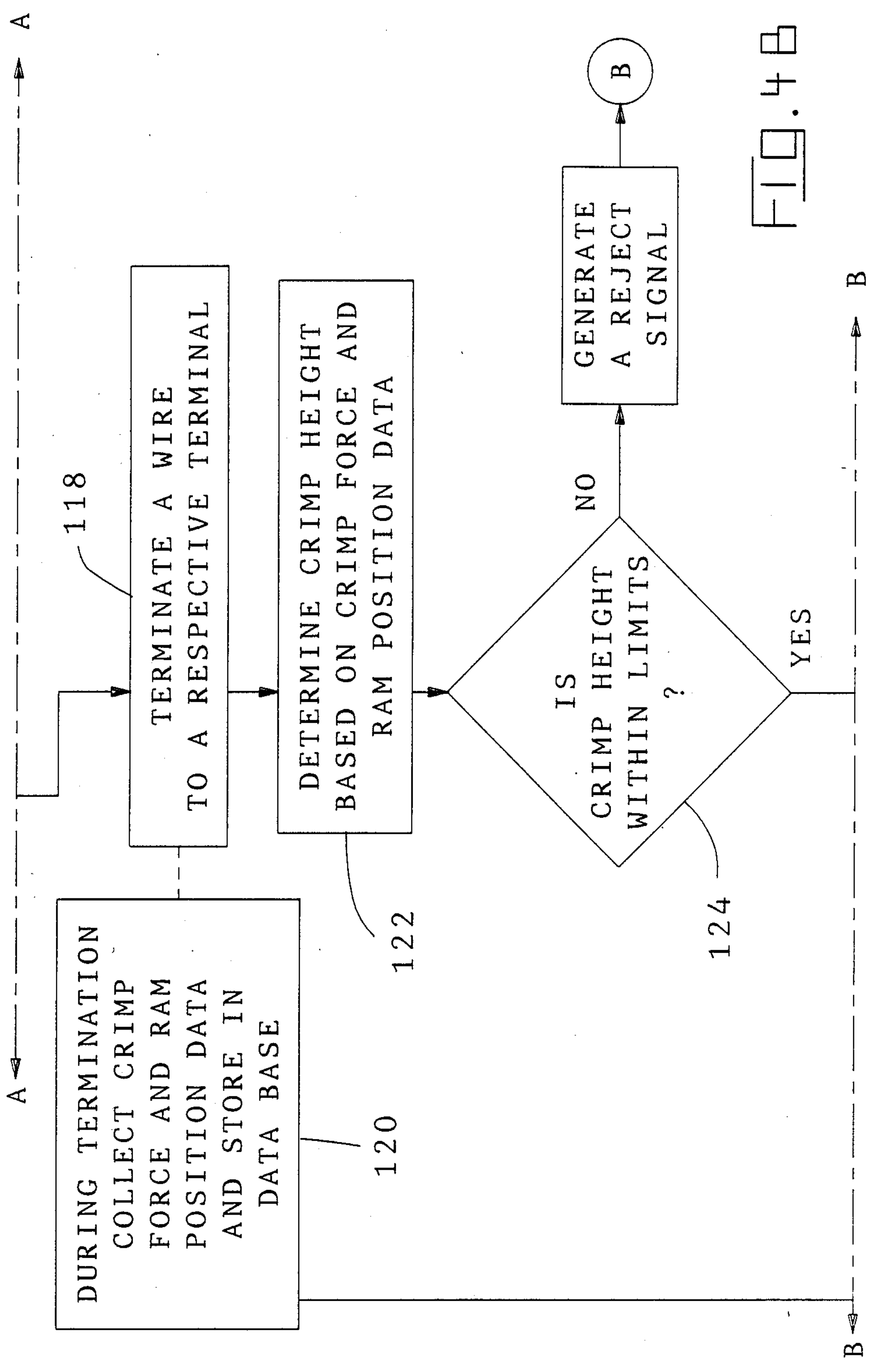
Figure 4C:
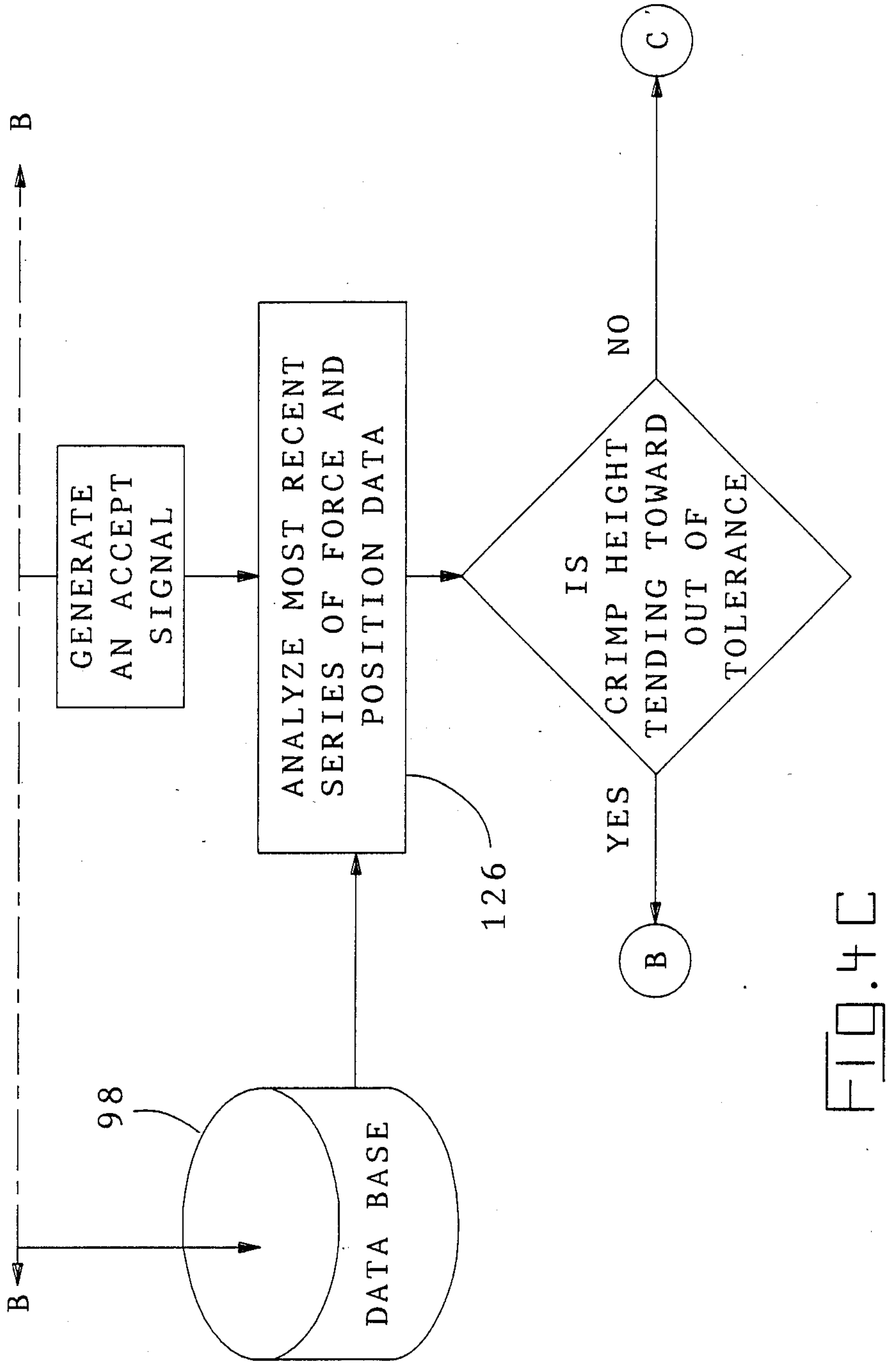

Steps 114 and 124 of FIG. 4 can be further enhanced by providing a mechanism to shut down the machine 10 in the event that an attempted automatic adjustment fails to bring the termination within the allowable limits. In such case an appropriate message can be displayed on the device 100 soliciting operator action.

An important advantage of the present invention is a wire terminating machine having the capability to monitor the quality of the termination by performing quantitative tests and then to adjust appropriate mechanisms of the machine to maintain that quality within acceptable preselected limits. The quantitative testing and adjusting occur automatically during production, requiring no operator intervention and thereby significantly reducing machine down time and reducing out of tolerance terminations.

I claim:

1. A method of terminating a plurality of wires in a plurality of respective terminals by means of an automated machine having:

a base;

a ram arranged for reciprocating movement with respect to said base;

a die set means comprising an anvil and a mating punch for effecting the termination of one of said wires in its said respective terminal, said anvil being coupled to said base and said punch being coupled to said ram;

means for determining and recording the force applied to said die set means by said ram during said termination;

means for determining and recording the position of said ram with respect to said base during said reciprocating movement;

means for determining the value of the crimp height of said termination based upon said determined ram position and corresponding force, and for comparing said determined value with a desired value and upon an unfavorable comparison generating an adjust signal; and means responsive to said adjust signal for adjusting the height of said anvil above said base, said method characterized by Inputting a code indicative of a desired crimp height;

(b) Automatically adjusting the height of said anvil above said base in response to said inputting of step (a) or to said comparing of steps (f)(i);

(c) Testing for completion of the job:

(i) if no further terminations are needed, generating an end-of-job signal and ceasing operation of the machine;

(ii) otherwise actuating said machine for effecting a termination of one of said plurality of wires to a respective terminal;

(d) During said terminating of steps (c)(ii), determining and recording force applied to said die set and concurrently a corresponding ram position for different incremental values of either force or ram position;

(e) Determining said value of said crimp height of said termination;

(f) Comparing said determined value of said crimp height with the value of said desired crimp height, (i) if said crimp height is out of tolerance, generate a reject signal and go to step (b);

(ii) otherwise generate an accept signal; and (g) Go to step (c).

2. The method according to claim 1 including step (f1) prior to step (g) as follows: (f1) Comparing a most recent series of said determined values of said crimp height with the value of said desired crimp height, and if said comparing indicates a trend toward an out-of-tolerance condition, go to step (b);

and wherein said adjusting of step (b) additionally occurs in response to said out-of-tolerance condition of step (f1).

3. The method according to claim 2 wherein said determining and recording of force and ram position occurs for different incremental values of only the ram position.

4. The method according to claim 1 wherein said comparing of step (f) (i) includes generating an adjust signal that is indicative of the magnitude of said out-of-tolerance crimp height and wherein said automatic adjusting of step (b) occurs in proportional response to said adjust signal.

5. In an automated machine for terminating a plurality of wires in a plurality of respective terminals having a base; a ram arranged for reciprocating movement with respect to said base; a die set means comprising an anvil and a mating punch for effecting the termination of one of said wires in its respective terminal, said anvil being coupled to said base and said punch being coupled to said ram; said machine being characterized by the combination:

(a) means for determining and recording the force applied to said die set means by said ram during said termination;

(b) means for determining and recording the position of said ram with respect to said base during said reciprocating movement;

(c) means for determining the value of the crimp height of said termination based upon said determined ram position and corresponding force for plurality of different incremental values of either force or ram position;

(d) means for comparing said determined value of the crimp height with a desired value thereof, and when the result of said comparing is an amount that exceeds a predetermined value, an adjust signal is generated; and (e) coupling means attached to said base for supporting said anvil a distance above said base toward said ram, said coupling means being responsive to said adjust signal for varying the crimp height of a subsequently formed termination.

6. The automated machine according to claim 5 wherein said means for determining the value of the crimp height includes a computer, and wherein said means for recording said force and said ram position includes a data base generated by said computer and containing said recorded force and ram position for a plurality of terminations; said machine including means for comparing the determined values of the crimp height of said plurality of terminations with the value of said desired crimp height to determine whether or not said values indicate a trend toward an out-of-tolerance condition and when such indication exists to generate an adjust signal.

7. The automated machine according to claim 5 wherein said coupling means comprises (a) a base plate supporting said anvil, coupled to said base and arranged to undergo movement in a direction toward said ram and away from said base and in an opposite direction away from said ram and toward said base;

(b) screw means for imparting said movement to said base plate upon rotation of said screw means; and (c) a rotational actuator responsive to said adjust signal for rotating said screw means a desired angular amount in a desired direction.

8. The automated machine according to claim 7 wherein said screw means of said coupling means is a relatively fine pitch screw in threaded engagement with a threaded bore in said base, said threaded bore having an axis which is substantially parallel with the axis of reciprocating movement of said ram.

9. The automated machine according to claim 8 wherein said rotational actuator is a motor drivingly coupled to said screw by means of a sprocket and timing belt.

* * * * *

UNITED STATES PATENT AND TRADEMARK OFFICE
CERTIFICATE OF CORRECTION

PATENT NO. : 4,916,810

DATED : April 17, 1990

INVENTOR(S) : Michael Anthony Yeomans

It is certified that error appears in the above-identified patent and that said Letters Patent is hereby corrected as shown below:

In claim 1, column 6, line 1, before the word "Inputting" add --(a)--.

Signed and Sealed this

Fourth Day of February, 1992

*Attest:*

HARRY F. MANBECK, JR.

*Attesting Officer* — *Commissioner of Patents and Trademarks*